(12) United States Patent
Stapleton et al.

(10) Patent No.: US 6,523,128 B1
(45) Date of Patent: Feb. 18, 2003

(54) CONTROLLING POWER FOR A SLEEPING STATE OF A COMPUTER TO PREVENT OVERLOADING OF THE STAND-BY POWER RAILS BY SELECTIVELY ASSERTING A CONTROL SIGNAL

(75) Inventors: Michael Stapleton, Portland, OR (US); Philip Doberenz, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/387,423

(22) Filed: Aug. 31, 1999

(51) Int. Cl.[7] ............... G06F 1/26; G06F 1/28; G06F 1/30
(52) U.S. Cl. ............ 713/330; 713/324; 713/340
(58) Field of Search ................ 713/330, 300, 713/340, 324, 323

(56) References Cited

U.S. PATENT DOCUMENTS

| 4,847,720 A | * | 7/1989 | Dezonno | 361/18 |
| 5,375,247 A | * | 12/1994 | Hueser | 713/330 |
| 5,410,711 A | | 4/1995 | Stewart | |
| 5,623,677 A | * | 4/1997 | Townsley et al. | 395/750 |
| 5,757,773 A | * | 5/1998 | Tsuji | 370/240 |
| 5,978,923 A | * | 11/1999 | Kou | 713/320 |
| 6,122,748 A | | 9/2000 | Hobson | |
| 6,266,776 B1 | * | 7/2001 | Sakai | 713/300 |

OTHER PUBLICATIONS

Global System State Definitions.

* cited by examiner

Primary Examiner—Thomas Lee
Assistant Examiner—James K. Trujillo
(74) Attorney, Agent, or Firm—Fish & Richardson P.C.

(57) ABSTRACT

A computer receives a sleep signal that instructs the computer to enter a sleeping state in which stand-by power from a power source is needed. The computer generates a control signal that initiates delivery of stand-by power from the power source in connection with the computer's entering the sleeping state. The control signal is asserted in at least one situation in which the sleep signal is asserted, and the control signal is not asserted in at least one other situation.

27 Claims, 3 Drawing Sheets

CONTROLLING POWER FOR A SLEEPING STATE OF A COMPUTER TO PREVENT OVERLOADING OF THE STAND-BY POWER RAILS BY SELECTIVELY ASSERTING A CONTROL SIGNAL

TECHNOLOGICAL FIELD

This application relates to controlling power for a sleeping state of a computer.

BACKGROUND

Many IBM-compatible personal computer (PC) systems incorporate some form of power management scheme that allows the computers to enter low-power sleeping states, sometimes without losing system context. In many cases, these computers include stand-by power regulators that supply a limited amount of current to a few system components, which stand ready to wake the computers from the sleeping states. If these power regulators cut in prematurely or shut off delinquently when the computers enter or exit the sleeping states, the regulators may be forced to supply more current to system components than they are designed to supply. Drawing too much current from a stand-by power regulator may cause the regulator's output voltage to fall below an acceptable level (i.e., to "crash") and thus prevent the computer from entering or exiting the low-power sleeping state properly.

SUMMARY

As a computer enters or exits a sleeping state, carefully selected shut-down sequences ensure that stand-by power rails are not forced to provide power to high-power system components as these components shut down or start up. This is particularly useful, for example, in a personal computer that supports a sleeping state in which some, but not all, of the system components continue to draw current. As a result, the computer's stand-by power rails tend not to crash as the computer enters or exits the sleeping state.

In one aspect, the invention involves receiving a sleep signal that instructs the computer to enter a sleeping state in which stand-by power from a power source is needed. A control signal initiates delivery of stand-by power from the power source in connection with the computer's entering the sleeping state. The control signal is asserted in at least one situation in which the sleep signal is asserted, and the control signal is not asserted in at least one other situation in which the sleep signal is asserted.

Other embodiments and advantages will become apparent from the following description and from the claims.

DETAILED DESCRIPTION

Figure 1:
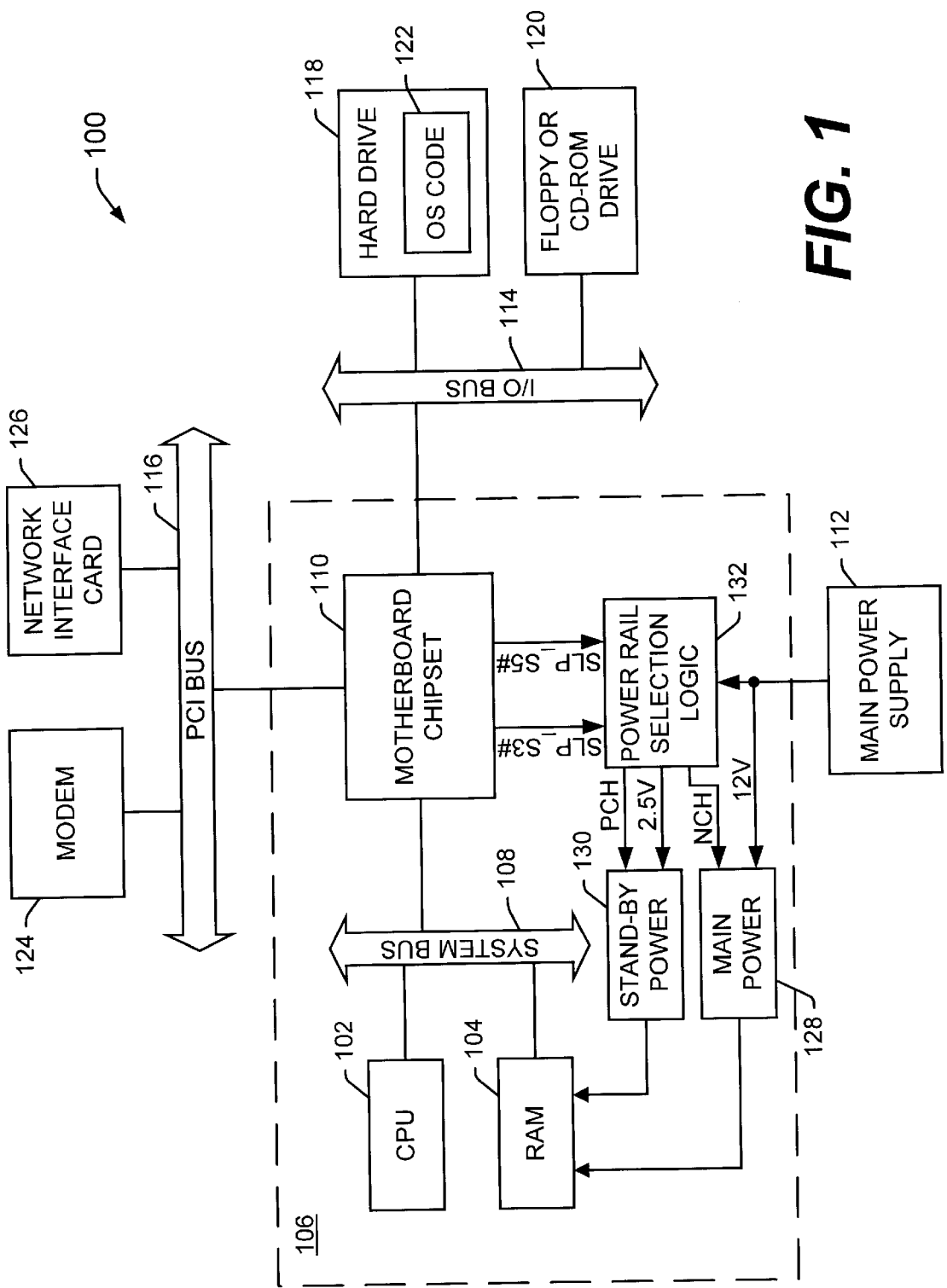
FIG. 1 is a partial block diagram of a computer system.

FIG. 1 shows a computer system that supports one or more low-power sleeping states, such as the "S3," or "Suspend-to-RAM," state and the "S5," or power-off, state defined by the "Advanced Configuration and Power Interface Specification" ("ACPI Specification"), version 1.0b, published by Intel Corporation, Microsoft Corporation, and Toshiba K. K. in February 1999. The computer system 100 includes at least one central processing unit (CPU) 102, or processor, and a memory unit 104 mounted to a motherboard 106. The memory unit 104 usually includes several modules of volatile memory, such as dynamic random access memory (DRAM), mounted on one or more printed circuit cards that connect to the motherboard 106. The processor 102 also typically resides on a printed circuit card mounted on the motherboard 106. A system bus 108 on the motherboard 106 supports transactions between the processor 102 and the memory unit 104.

A motherboard chipset 110 manages transactions between the system bus 108 and other system components, such as the computer's basic input/output system (BIOS) and peripheral components like those described below. The motherboard chipset 110 includes a system address and data controller, which performs what is known as "northbridge functionality" in some computer systems, and an input/output controller hub, which performs what is known as "southbridge functionality" in some systems. The motherboard chipset 110 is responsible for managing the computer's entry into and exit from low-power sleeping states, such as the ACPI "S3" and "S5" states.

The computer system 100 also includes one or more data buses that support communication between the motherboard 106 and one or more peripheral components. One such bus is an I/O bus 114, on which the computer's hard drive 118 and floppy/CD-ROM drives 120 reside. The hard drive 118 stores, among other things, the computer's operating system (OS) code 122, which, upon boot-up, is loaded into the memory unit 104 for execution by the processor 102.

Another type of data bus usually found in the computer system 100 is a peripheral component interface (PCI) bus 116 that complies with the "PCI Local Bus Specification Rev. 2.1" ("PCI 2.1"), published on Jun. 1, 1995, or the "PCI Local Bus Specification Rev. 2.2" ("PCI 2.2"), published on Dec. 18, 1998, by the PCI Special Interest Group. One or more PCI 2.1/2.2 compliant peripheral devices, such as a modem 124 and a network interface card (NIC) 126, connect to the PCI bus 116.

In addition to the components described above, the motherboard 106 includes several voltage regulators that deliver power from the computer's main power supply 112 to the components residing on the motherboard 106. These power regulators often include both a main power regulator 128 and a stand-by power regulator 130 for the memory unit 104. The main power regulator 128 supplies power to the memory unit 104 when the computer is in its normal operating state, known as the "S0" state in an ACPI-compliant system. The stand-by power regulator 130 provides power to the memory unit 104 at reduced levels when the computer is in certain low-power sleeping states, such as the ACPI "S3" state. Some computers also include power regulators dedicated to PS2 and USB stand-by power.

In the "S3" state, the computer does not lose system memory context. All other system context, including processor, cache memory, and motherboard chipset context, is lost to the extent that it is not stored in system memory before the computer enters the "S3" state. The stand-by power regulator 130 provides power to the memory unit 104 during this sleeping state to preserve memory context. The regulators for PS2 and USB stand-by power also are active during the "S3" state. Most other ACPI sleeping states do not use these stand-by regulators, including the "S1" state in which no system context is lost and the memory unit 104 operates near full power, and the "S5" and "S4" states in which almost all system context is lost and the memory unit 104 draws virtually no power. In many computer systems, such as the one described here, the "S3" sleeping state is the only state for which the stand-by power regulator 130 is active.

The motherboard chipset 110 generates control signals, such as the conventional SLP_S3# and SLP_S5# signals, that instruct the computer system 100 to enter and exit the various sleeping states. In many computer systems, the main power regulator and the stand-by power regulator are driven directly by these signals. Driving the regulators in this manner often causes both regulators to operate at the same time. For most computers, this causes no problems. However, as power management becomes more complex and high power components, such as RAMBUS nonconfigured memory, are used more frequently, switching or leaving a stand-by power regulator on while high power system components are operating is likely to overload, or crash, the stand-by power rail.

A power rail selection circuit 132 on the motherboard 106 helps prevent overloading the stand-by power rail. This circuit 132 receives the control signals from motherboard chipset 110 and coordinates switching of the voltage regulators to reduce the likelihood of stand-by rail overload. As described below, in a system that supports the ACPI "S3" and "S5" sleep states, the power rail selection circuit 132 receives two control signals from the motherboard chipset 110 and provides two control outputs (NCH and PCH). One of the control signals is the standard SLP_S5# signal, and one is an inverted version of the standard SLP_S3# signal. Alternatively, the second control signal can be generated by combining the SLP_S3# signal with another signal, such as by performing a logic NAND operation between the SLP_S3# signal and a PWR_GOOD signal that indicates whether the computer is receiving power from its main power source.

One of the output signals (NCH) controls switching of the main power regulator 128 for the memory unit 104, and the other output signal (PCH) controls switching of the stand-by power regulator 130. The power rail selection circuit 132 generates the NCH and PCH signals so that one of the regulators switches on as the other regulator switches off. Delay times are selected to ensure that the stand-by regulator is not forced to supply power to devices that shut down during the "S3" state.

In this example, the main power regulator 130 includes an n-channel field-effect transistor (FET) and the stand-by power regulator includes a p-channel FET to control power switching. Switching in the main power regulator 128 is driven by the NCH signal, and switching in the stand-by power regulator is driven by the PCH signal.

The power selection circuit 132 also provides a regulated stand-by voltage (2.5V) to the stand-by power regulator 130. The power selection circuit 132 and the main power regulator 128 both receive power from the main power supply 112.

Figure 2:
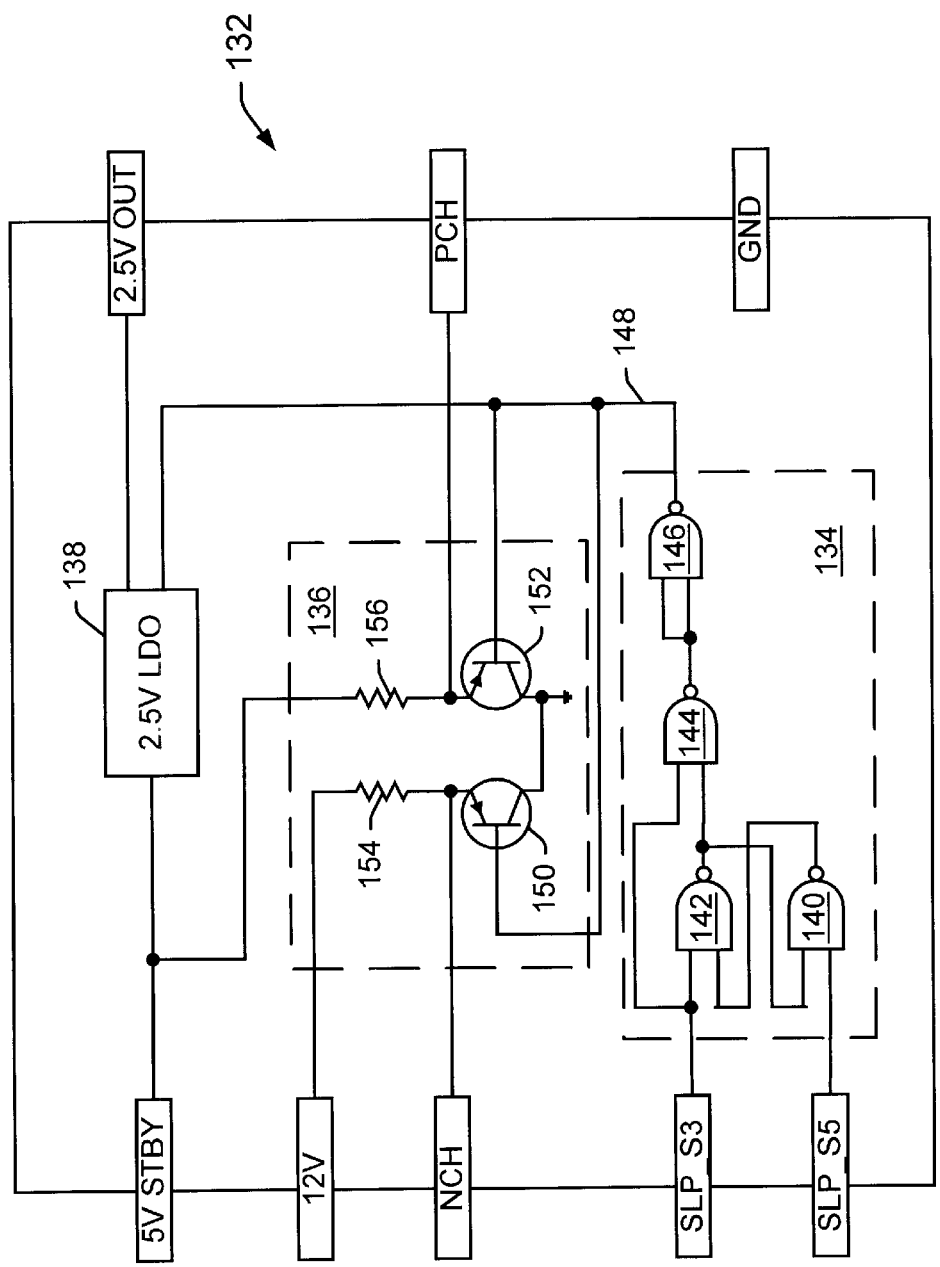
FIG. 2 is a schematic diagram of a circuit that controls the computer's switching between a main power rail and a stand-by power rail when entering and exiting a sleeping state.

FIG. 2 shows one implementation of the power rail selection circuit 132. In this example, the circuit is implemented as an 8-pin integrated circuit (IC). Other implementations include multiple integrated circuits, discrete components, or a combination of technologies. The circuit 132 includes three primary blocks: (1) a logic circuit 134 that controls the switching states of the power regulators; (2) a driver circuit 136 that drives the NCH and PCH control signals; and (3) a voltage-regulated LDO circuit 138 that provides power to the stand-by power regulator 130.

The logic circuit 134 receives two signals from the computer's motherboard chipset. One of these signals (SLP_S5) instructs the computer to enter the ACPI "S5" sleeping state. The other signal (SLP_S3) instructs the computer to enter the ACPI "S3" sleeping state. A series of NAND gates 140, 142, 144, 146 in the logic circuit form a logic device, such as a flip-flop, that drives a control line 148 connected to the driver circuit 136 and to the voltage-regulated LDO circuit 138. The value of the signal on the control line 148 varies in response to transitions in the SLP_S3# and SLP_S5# signals. A change in the signal on the control line 148 causes the main power regulator 128 and the stand-by power regulator 130 to change states, thus switching the source of power to the main memory unit 104. Operation of the logic circuit 134 is described in more detail below.

The driver circuit 136 includes switching components that drive the NCH and PCH signals as needed to ensure that the main power regulator 128 and the stand-by power regulator 130 switch at approximately the same time. In this example, the driver circuit 136 includes two transistors 150, 152, each implemented as an NPN bipolar junction transistor (BJT). Other embodiments use different types of transistors, such as FETs, and even different types of switching elements altogether. The emitters of the transistors 150, 152 are coupled to ground.

The collector of one of the transistors 150 is coupled to the main power supply rail (12V) through a pull-up resistor 154, and the collector of the other transistor 152 is coupled to a 5-volt standby rail (5B_STBY) through another pull-up resistor 156. The base of each of the transistors 150, 152 is driven by the control line 148 from the logic circuit 134. The NCH signal is driven by the collector of one of the transistors 150, and the PCH signal is driven by the collector of the other transistor 152. In this example, the NCH and PCH signals always have the same logic values, so the n-channel switch in the main power regulator 128 switches off or on when the p-channel switch in the stand-by power regulator 130 switches on or off, respectively. The stand-by power regulator 130 switches on and the main power regulator 128 switches off when the signal on the control line 148 is asserted.

The voltage-regulated LDO circuit 138 is coupled to both the 5-volt stand-by rail (5V_STBY) and the control line 148. This circuit supplies a 2.5-volt stand-by voltage to the stand-by regulator 130 when the signal on the control line 148 is asserted.

Figure 3:
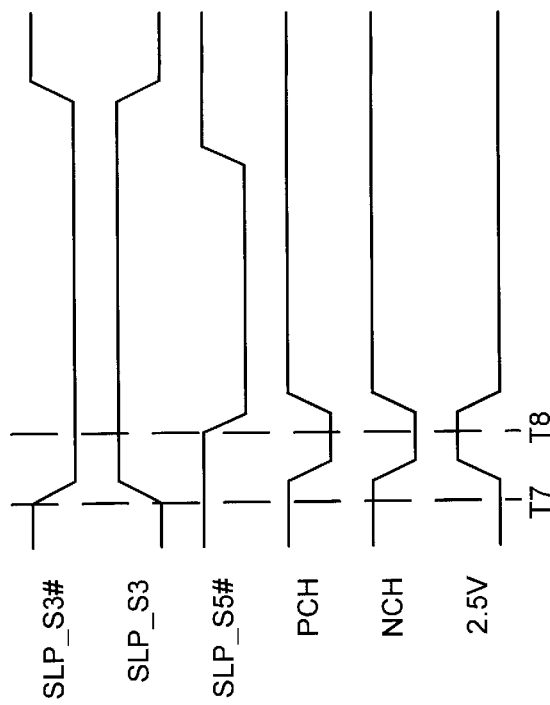
FIGS. 3, 4, and 5 are timing diagrams for the circuit of FIG. 2.
Figure 4:
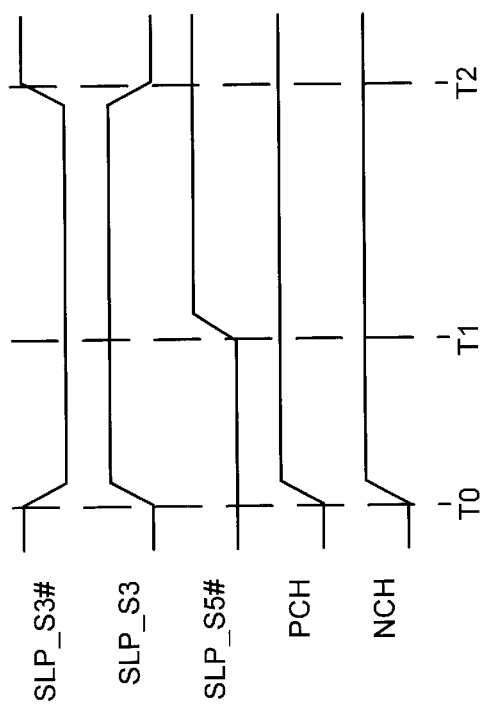
Figure 5:
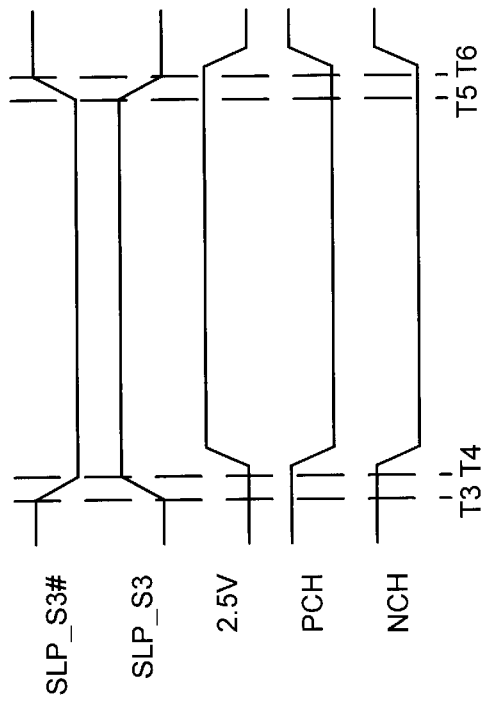

FIGS. 3, 4, and 5 are timing diagrams illustrating the operation of the power rail selection circuit 132. FIG. 3 shows the circuit's operation during the power-up sequencing that occurs as the computer transitions from the ACPI power-off ("S5") state to its normal operating ("S0") state. When the computer first begins to exit the "S5" state, at time T0, the motherboard chipset 110 asserts the SLP_S3# signal, and the inverted signal SLP_S3 follows the main power supply rail to its high value. The NCH and PCH signals also follow the supply rail to its high value, causing the main power supply regulator 128 to switch on and causing the stand-by power supply regulator 130 to remain off. The high value of the SLP_S3 signal and the low value of the SLP_S5# signal cause the logic circuit to output a low value on the control line 148.

At a time T1 after the power-up sequence begins, the motherboard chipset 110 deasserts the SLP_S5# signal.

Because the computer is exiting the "S5" state and is entering the "S0" state, the main power regulator 128 should remain on and the stand-by power regulator 130 should remain off. In this situation, deasserting the SLP_S5# signal does not affect the signal on the control line 148, so the NCH and PCH signals remain at high values, and the main and stand-by power regulators do not switch states.

Shortly after the SLP_S5# signal is deasserted, at time T2, the motherboard chipset 110 deasserts the SLP_S3# signal to indicate that the computer has successfully reached its normal operating state (the "S0" state). Again, the main power regulator 128 should remain on, and the stand-by power regulator 130 should remain off. In this situation, deassertion of the SLP_S3# signal does not affect the signal on the control line 148, so the NCH and PCH signals remain at high values. As a result, the main power regulator 128 remains on, and the stand-by power regulator 130 remains off.

FIG. 4 shows the operation of the power rail selection logic 132 as the computer transitions from the "S0" state to the "S3" state and then back to the "S0" state. Before entering the "S3" state, the SLP_S3# and SLP_S5# signals are deasserted, and the NCH and PCH signal have high values. As a result, the main power regulator 128 is on, and the stand-by power regulator 130 is off. The voltage-controlled LDO circuit 138 does not drive the 2.55-volt stand-by rail. Upon entering the "S3" sleep state, the main power regulator 128 should switch off as the stand-by regulator 130 and the voltage-controlled LDO circuit 138 switch on. The SLP_S5# signal remains deasserted (i.e., at a high value) throughout this sequence.

At time T3, the motherboard chipset 110 asserts the SLP_S3# signal to indicate that the computer should enter the "S3" state. Shortly after the inverted signal SLP_S3 reaches the high voltage rail, at time T4, the logic circuit 134 asserts the signal on the control line 148. In response, the NCH and PCH signals switch from high values to low values, causing the main power regulator 128 to switch off and causing the stand-by power regulator 130 to switch on. The voltage-controlled LDO circuit 138 also switches on and thus begins driving the 2.5-volt stand-by rail.

At time T5, the motherboard chipset 110 deasserts the SLP_S3# signal to instruct the computer to exit the "S3" state and return to the "S0" state. Shortly after the SLP_S3# signal reaches the high voltage rail, at time T6, the logic circuit 134 deasserts the signal on the control line 148. The NCH and PCH signals both respond by returning to high values, causing the main power regulator 128 to switch on again as the stand-by power regulator 130 switches off. The voltage-controlled LDO circuit 138 also switches off at time T6 and thus stops driving the 2.5-volt stand-by rail.

FIG. 5 shows the operation of the power rail selection logic 132 as the computer transitions from the "S0" state to the power-off ("S5") state. When instructing the computer to enter the "S5" state, the motherboard chipset 110 first asserts the SLP_S3# signal and then asserts the SLP_S5# signal. The stand-by power regulator should remain off as the computer enters the "S5" state.

At time T7, the motherboard chipset 110 asserts the SLP S3# signal in preparation for entering the "S5" state. The logic circuit 134 reacts as though the computer is entering the "S3" state and thus asserts the signal on the control line 148. The NCH and PCH signals respond by switching from high values to low values, which causes the stand-by power regulator 130 to switch on temporarily. At time T8, however, the motherboard chipset 110 asserts the SLP_S5# signal to instruct the computer to enter the "S5" state, and the logic circuit 134 deasserts the signal on the control line 148. In response, the NCH and PCH signals transition to high values, and the stand-by regulator 130 switches off for entry into the "S5" state.

Each of the scenarios of FIGS. 3, 4, and 5 illustrate a unique reaction by the NCH and PCH in response to assertion of the SLP_S3# signal. In the scenario of FIG. 3, the PCH signal remains at a high value and the stand-by power regulator remains off after the SLP_S3# signal is asserted. The PCH signal temporarily switches to a low value in the scenario of FIG. 5, but assertion of the SLP_S5# signal causes the PCH signal to switch back to a high value, thus ensuring that the stand-by power rail is switched off as the computer enters the "S5" state. In the scenario of FIG. 4, the PCH signal switches to a low value, and thus switches the stand-by power regulator on, in response to assertion of the SLP_S3# signal. The PCH signal remains at the low value until the SLP_S3# signal is deasserted. This ensures that the stand-by power regulator remains on while the computer is in the "S3" state. In each scenario, the driver circuit 136 ensures that the main power regulator 128 and the stand-by power regulator 130 switch simultaneously.

Other embodiments are within the scope of the following claims. For example, a wide variety of implementations of the power rail selection logic are possible. The common-emitter configuration of FIG. 2 is only one implementation of the driver circuit. Other implementations include two pairs of bipolar unction transistors arranged in a common-emitter, totem-pole configuration, and CMOS transistors arranged in a push-pull configuration. Other embodiments include a pair of diodes that connect one or both of the driver transistors to both the 12V main power rail and the 5V standby rail so that either power rail can be used to drive the NCH and PCH output lines. This is useful, for example, in systems for which the 12V power rail does not exist during the low-power sleeping state. Moreover, the stand-by and main power regulators can be implemented, for example, in a single regulator chip that switches between the two power rails. In some computer systems, the power rail selection logic is used to control switching of stand-by power to components other than or in addition to main memory, including the PS2 and USB stand-by regulators described above. The invention also is useful at voltage levels other than those shown here (e.g. 3.3 volts) and with a wide variety of memory technologies such as RAMBUS and SDRAM.

What is claimed is:

1. A circuit comprising:
   an input signal line connected to receive a sleep signal that instructs a computer to enter a sleeping state in which stand-by power from a power source is needed;
   a control signal line connected to carry a control signal that initiates delivery of stand-by power from the power source in connection with the computer's entering the sleeping state; and
   control circuitry connected to the input signal line and to the control signal line and configured to assert the control signal in at least one situation in which the sleep signal is asserted and configured not to assert the control signal in at least one other situation in which the sleep signal is asserted, to prevent overloading of the stand-by power.

2. The circuit of claim 1, wherein the sleep signal is a signal that instructs the computer to enter an ACPI "S3" sleeping state.

3. The circuit of claim 1, further comprising another input signal line connected to receive an input signal that instructs the computer to enter a sleeping state in which stand-by power is not needed from the power source.

4. The circuit of claim 3, wherein the control circuitry is configured to assert the control signal if the sleep signal transitions from an unasserted state to an asserted state while the input signal is in an unasserted state.

5. The circuit of claim 3, wherein the control circuitry is configured to deassert the control signal if the input signal transitions from an unasserted state to an asserted state while the sleep signal is in an asserted state.

6. The circuit of claim 3, wherein the control circuitry includes two NAND gates, one of which is connected to receive input from the input signal line that carries the sleep signal, and one of which is connected to receive input from the input signal line that carries the input signal.

7. The circuit of claim 6, wherein each of the NAND gates is connected to receive an input from an output of the other one of the NAND gates.

8. The circuit of claim 6, wherein the control circuitry includes at least one additional NAND gate that is connected to receive an input from one of the other NAND gates and from the input signal line that carries the sleep signal.

9. The circuit of claim 3, wherein the input signal instructs the computer to enter an ACPI "S5" sleeping state.

10. The circuit of claim 1, further comprising a driver circuit configured to switch on the stand-by power from the power source in response to assertion of the control signal.

11. The circuit of claim 10, wherein the driver circuit also is configured to switch off power from another power source as it switches on power from the stand-by power source.

12. The circuit of claim 11, wherein the driver circuit includes at least two switching transistors, one of which is connected to control switching of the stand-by power source, and one of which is connected to control switching of the other power source.

13. The circuit of claim 1, further comprising voltage regulating circuitry connected to the control line and configured to supply stand-by power in response to assertion of the control signal.

14. A method comprising:
  receiving a sleep signal that instructs a computer to enter a sleeping state in which stand-by power from a power source is needed;
  generating a control signal that initiates delivery of stand-by power from the power source in connection with the computer's entering the sleeping state; and
  preventing overloading of the stand-by power by placing the control signal into an asserted state in at least one situation in which the sleep signal is in an asserted state, and placing the control signal into an unasserted state in at least one other situation in which the sleep signal is in an asserted state.

15. The method of claim 14, wherein receiving the sleep signal includes receiving a signal that instructs the computer to enter an ACPI "S3" sleeping state.

16. The method of claim 14, further comprising receiving an input signal that instructs the computer to enter a sleeping state in which stand-by power is not needed from the power source.

17. The method of claim 16, wherein placing the control signal into an asserted state includes asserting the control signal if the sleep signal transitions from an unasserted state to an asserted state while the input signal is in an unasserted state.

18. The method of claim 16, further comprising deasserting the control signal if the input signal transitions from an unasserted state to an asserted state while the sleep signal is in an asserted state.

19. The method of claim 16, wherein receiving the input signal includes receiving a signal that instructs the computer to enter an ACPI "S5" sleeping state.

20. A computer system comprising:
  a processor;
  a memory unit;
  a peripheral device coupled to a peripheral bus over which the processor and the peripheral device exchange data;
  power circuitry connected to deliver stand-by power to the memory unit during a sleeping state in which data remains stored in the memory unit;
  power control circuitry configured to assert a sleep signal when the computer system is to enter the sleeping state;
  a control line coupled to the power circuitry to deliver a control signal that activates the power circuitry in connection with the computer's entering the sleeping state; and
  control circuitry configured to assert the control signal in at least one situation in which the sleep signal is asserted and configured not to assert the control signal in at least one other situation in which the sleep signal is asserted, to prevent overloading of the stand-by power.

21. The computer of claim 20, wherein the power circuitry includes a stand-by power regulator.

22. The computer of claim 21, wherein the power circuitry is configured to connect power from the stand-by power regulator to the memory unit in connection with the computer's entering the sleeping state.

23. The computer of claim 21, wherein the power circuitry also includes main power regulator.

24. The computer of claim 23, wherein the power circuitry is configured to disconnect power from the main power regulator to the memory unit and connect power from the stand-by regulator to the memory unit in connection with the computer's entering the sleeping state.

25. The computer of claim 20, wherein the power control circuitry is also configured to generate a power-off signal that instructs the computer to enter a sleeping state in which no data is to remain stored in the memory unit.

26. The computer of claim 25, wherein the control circuitry is configured to assert the control signal if the sleep signal transitions from an unasserted state to an asserted state while the power-off signal is in an unasserted state.

27. The computer of claim 25, wherein the control circuitry is configured to deassert the control signal if the power-off signal transitions from an unasserted state to an asserted state while the sleep signal is in an asserted state.

* * * * *